(12) United States Patent
Nalala Pochaiah et al.

(10) Patent No.: US 12,535,792 B2
(45) Date of Patent: Jan. 27, 2026

(54) ARTIFICIAL INTELLIGENCE ALARM MANAGEMENT

(71) Applicant: Schneider Electric Systems USA, Inc., Foxboro, MA (US)

(72) Inventors: Anil Kumar Nalala Pochaiah, Hyderabad (IN); Hafiz Banire, Montgomery, IL (US); Sachin Vaidya, Thane (IN); Suhas Bendle, Chandrapur (IN); Ashish Patil, Pune (IN); Niranjana Mahendran, Chennai (IN)

(73) Assignee: SCHNEIDER ELECTRIC SYSTEMS USA, INC., Foxboro (MA)

( * ) Notice: Subject to any disclaimer, the term of this patent is extended or adjusted under 35 U.S.C. 154(b) by 477 days.

(21) Appl. No.: 17/746,299

(22) Filed: May 17, 2022

(65) Prior Publication Data

US 2022/0382245 A1 Dec. 1, 2022

(30) Foreign Application Priority Data

May 28, 2021 (IN) .............................. 202111023899
Sep. 16, 2021 (IN) .............................. 202111041859

(51) Int. Cl.
*G05B 19/406* (2006.01)
(52) U.S. Cl.
CPC .. *G05B 19/406* (2013.01); *G05B 2219/31439* (2013.01)

(58) Field of Classification Search
CPC .............. G05B 19/406; G05B 19/4184; G05B 2219/31437; G05B 2219/31439; G05B 23/0272
See application file for complete search history.

(56) References Cited

U.S. PATENT DOCUMENTS

| | | | |
|---|---|---|---|
| 9,374,660 B1* | 6/2016 | Tilles | H04W 4/02 |
| 2016/0063845 A1* | 3/2016 | Lloyd | G05B 23/027 |
| | | | 340/679 |
| 2017/0357908 A1* | 12/2017 | Cabadi | G05B 13/0265 |
| 2020/0005094 A1 | 1/2020 | Sinha et al. | |
| 2020/0327029 A1* | 10/2020 | Prakash | G06N 5/04 |
| 2021/0149362 A1* | 5/2021 | Faraj | G05B 19/056 |

OTHER PUBLICATIONS

Partial European Search Report, dated Nov. 7, 2022, 15 pages.

* cited by examiner

*Primary Examiner* — Tameem D Siddiquee
(74) *Attorney, Agent, or Firm* — Stinson LLP (57) ABSTRACT

An alarm rationalization system receiving and responsive to industrial process information collected from a process control system for identifying one or more alarms and executing an artificial intelligence (AI) alarm engine. The AI alarm engine builds a process/domain model based on the received industrial process information and historized alarm information to evaluate the alarms in accordance with a predefined alarm philosophy. The AI alarm engine then generates a plurality of alarm definitions based on the model to optimize the alarms. The AI alarm engine automatically populates a Master Alarm Database (MADB) with the alarm definitions. The alarms are then rationalized based on the alarm definitions stored in the MADB.

26 Claims, 11 Drawing Sheets

FIG. 8B

ARTIFICIAL INTELLIGENCE ALARM MANAGEMENT

CROSS-REFERENCE TO RELATED APPLICATIONS

This application claims priority from Indian Provisional Patent Application No. 202111023899, filed May 28, 2021, and Indian Provisional Patent Application No. 202111041859, filed Sep. 16, 2021, the entire disclosures of which are incorporated herein by reference.

BACKGROUND

Alarm rationalization is the process of reviewing, validating, and justifying alarms as part of an alarm management philosophy. The goal of alarm rationalization is to determine the most efficient number of alarms to ensure that a process system is safe and remains within the operating range. Conventional alarm rationalization processes are manual and require input from senior process engineers, senior operators, and the like. These senior employees begin by brainstorming in a workshop to come up with alarm rationalization configurations, settings, and/or guidelines to review potential alarms against criteria in an alarm philosophy document for both unrationalized and rationalized systems. They define alarm attributes, document the rationale for each alarm, and store this information in a Master Alarm Database (MADB) (also known as an alarm catalog).

This entire process of preparing and generating a MADB report (or guide) that captures a configuration for each alarm is time-consuming. For example, a single plant may have tens of thousands of alarms based on the process requirements at the plant and conventional alarm rationalization requires an advanced user to spend approximately 15-20 minutes per alarm to configure an alarm with rationalization settings or parameters. Overall, alarm rationalization often takes several weeks or even months of work by a team of advanced users depending on the complexity of the industrial processes involved in a plant.

Current Alarm Rationalization Standards include: ISA 18.2, EEMUA 191, IEC 62682, and others.

SUMMARY

Aspects of the present disclosure provide an artificial intelligence (AI) based alarm management solution adhering to alarm management philosophy and standards and capable of incorporating into existing and new systems (i.e., rationalized and unrationalized systems) that enables assessment, identifies improvements, provides a provision to automate, and applies recommendations to an audit to improve the "alarm system performance" metrics, equipment/device/asset operational metrics, and "operator efficiency" with alarm metrics and key performance indicators (KPIs) driven by any plant/industry where alarm management philosophy and standards are applied.

In an aspect, an alarm rationalization system comprises an advisory system processor receiving and responsive to industrial process information collected from a process control system and an advisory system database coupled to the advisory system processor. The advisory system database stores historized alarm information collected from the process control system. The system also comprises a MADB coupled to the advisory system processor and a memory storing computer-executable instructions. The instructions, when executed by the advisory system processor, configure the advisory system processor for receiving the industrial process information, identifying one or more alarms based on the received industrial process information, and executing an AI alarm engine. Executing the AI alarm engine comprises building a process/domain model based on the received industrial process information and the historized alarm information to evaluate the alarms in accordance with a predefined alarm philosophy, generating, by the process/domain model, a plurality of alarm definitions to optimize the alarms, and automatically populating the MADB with the alarm definitions. The instructions, when executed by the advisory system processor, further configure the advisory system processor for rationalizing the alarms based on the alarm definitions stored in the MADB.

In another aspect, a method of alarm rationalization in a process control system comprises receiving, by an advisory system processor of the process control system, industrial process information collected from the process control system and storing historized alarm information collected from the process control system in an advisory system database coupled to the advisory system processor. The method further comprises identifying, by the advisory system processor, one or more alarms based on the received industrial process information and executing, by the advisory system processor, an AI alarm engine. Executing the AI alarm engine comprises building a process/domain model based on the received industrial process information and the historized alarm information to evaluate the alarms in accordance with a predefined alarm philosophy, generating, by the process/domain model, a plurality of alarm definitions to optimize the alarms, and automatically populating a MADB with the alarm definitions. The method also comprises rationalizing, by the advisory system processor, the alarms based on the alarm definitions stored in the MADB.

In yet another aspect, a method of alarm rationalization in an alarm system of a process control system comprises defining a default alarm setting for at least one of an equipment alarm and a custom process alarm, defining a rationalization guide independent of a rationalization status of the alarm system, and executing logic on a controller of the process control system to trigger an alarm in response to a predetermined condition. The method also comprises defining and creating a minimum set of alarms required to maintain predetermined operating limits (e.g., normal and safe operating limits of the device/equipment/asset and/or the process control system) based on a predetermined standards-based alarm philosophy, historizing data collected from the process control system, and identifying and predicting performance improvement patterns based on the historized data. The method further includes training an AI alarm engine to perform one or more of the previous steps, generating one or more alarm rationalization settings based on an audit of the performance improvement patterns, automatically populating an alarm rationalization MADB report to feed the alarm rationalization settings to the alarm system, and repeatedly retraining the AI alarm engine.

Other objects and features of the present disclosure will be in part apparent and in part pointed out herein.

BRIEF DESCRIPTION OF THE DRAWINGS

Corresponding reference numbers indicate corresponding parts throughout the drawings.

DETAILED DESCRIPTION

Figure 1:
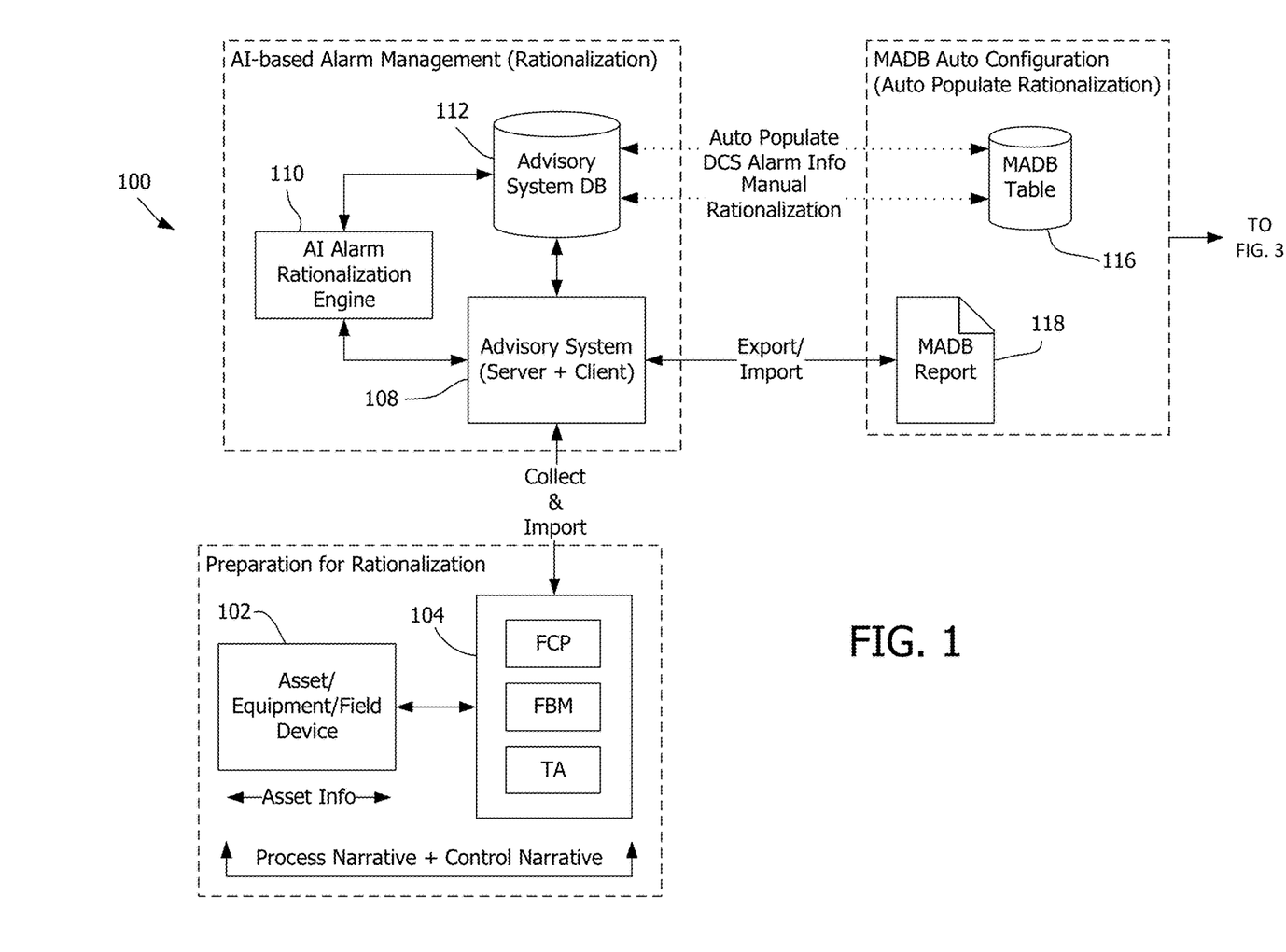
FIG. 1 illustrates an alarm rationalization system according to an embodiment.

Referring to the figures and description below, a system 100 to support alarm rationalization based on artificial intelligence (AI), such as machine learning (ML), is disclosed. FIG. 1 is a block diagram illustrating the system 100 executing an example process embodying aspects of the present disclosure. In an embodiment, default alarms are defined for assets 102 (e.g., equipment, field devices, hardware, etc.) of an industrial process in preparation of alarm rationalization. The default alarms include alarm settings and a rationalization guide for the equipment alarms. Preparing for alarm rationalization further focuses on defining custom process alarms based on designed control narratives/loops and process flow configuration diagrams involving assets 102 and one on more control devices 104 (e.g., Fieldbus Module (FBM), Field Control Processor (FCP), Termination Assembly (TA)). In general, process experts or senior operators develop the control narratives/loops and process flow configurations from existing knowledge of the industrial plant.

As shown in FIG. 1, preparation for rationalization involves collecting asset information as well as process narratives and control narratives. In an embodiment, process flow narratives are mapped with corresponding control narratives (e.g., control logics or loops) implemented using distributed control system (DCS) blocks. A controller of the industrial process (e.g., control device 104) executes the narratives and triggers an alarm, i.e., an audible and/or visual indication to an operator that an equipment malfunction, a process deviation, or another abnormal condition requires a timely response. As described above, conventional alarm rationalization requires a team of senior process experts, senior operators, and the like to review potential alarms against the criteria in the predetermined alarm philosophy and standards. The primary goal is to create the minimum set of alarms needed for any system (i.e., unrationalized or previously rationalized) to keep the plant safe and within normal operating limits. Preparation for rationalization also includes preparation of an "alarm rationalization" guide working with senior process experts and senior operators in a workshop. This guide is to be used by the operators working on the workstations.

Figure 2:
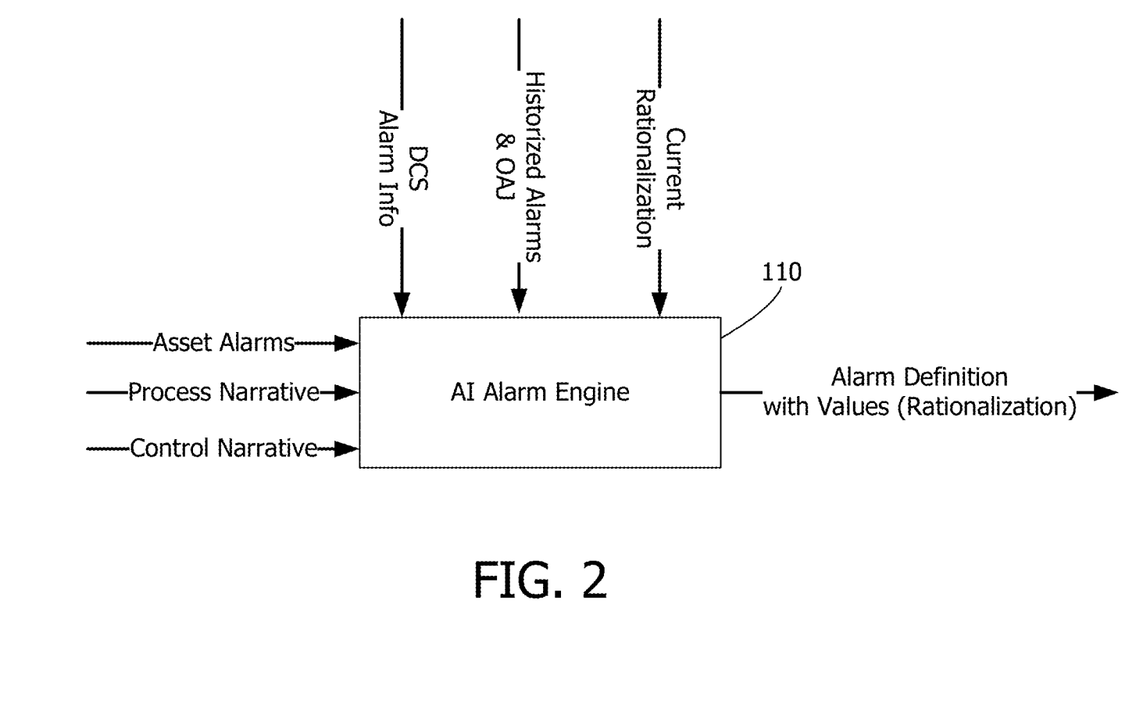
FIG. 2 illustrates an artificial intelligence (AI) alarm engine for use in the system of FIG. 1.

Aspects of the present disclosure incorporate an AI-based alarm management solution into both unrationalized and rationalized systems to enable assessment, identify improvements, provide a provision to automate, apply recommendations to an audit, etc. In an embodiment, an advisory system 108 imports the collected asset and narratives information for training an AI alarm engine 110 (see also FIG. 2) for automating the rationalization process. In an embodiment, the AI alarm engine 110 comprises computer-executable instructions executed by a processor of advisory system 108. As shown in FIG. 2, the AI-based alarm engine 110 receives inputs of asset alarms and process and control narrative via assets 102 and control devices 104. In addition, the advisory system 108 provides DCS alarm information, historized alarms and Operator Action Journal (OAJ) messages, and current rationalization information to AI alarm engine 110 via an advisory system database 112. Once trained, AI alarm engine 110 outputs an alarm definition with values (i.e., a rationalization) for auto-populating a Master Alarm Database (MADB) 116, which is the authorized listing of rationalized alarms and associated attributes. For example, the MADB 116 stores alarm instance data, including alarm type, alarm priority, alarm class, alarm limit (setpoint), operator action, consequence of inaction, etc. The required input parameters are input into the alarm engine 110 for the system 100 to train and evolve to create an alarm rationalization report (or guide), i.e., MADB report 118 specific to the industrial plant based on the alarm definitions and values from MADB 116.

The alarm rationalization MADB report 118 feeds the generated "rationalization settings" to the advisory system 108 software (or any MADB-supported software). In an embodiment, alarm rationalization settings or parameters documented in MADB report 118 are automatically configured into the advisory and/or alarm visualization software(s), such as advisory system 108 software, or any MADB-supported software to improve the device/equipment, operator, and engineering efficiency of the control system. It is to be understood that aspects of the present disclosure can be applied to other applications outside of process automation. In contrast, conventional alarm rationalization requires an advanced user to spend approximately 15-20 minutes per alarm to configure an alarm with rationalization settings or parameters.

Figure 3:
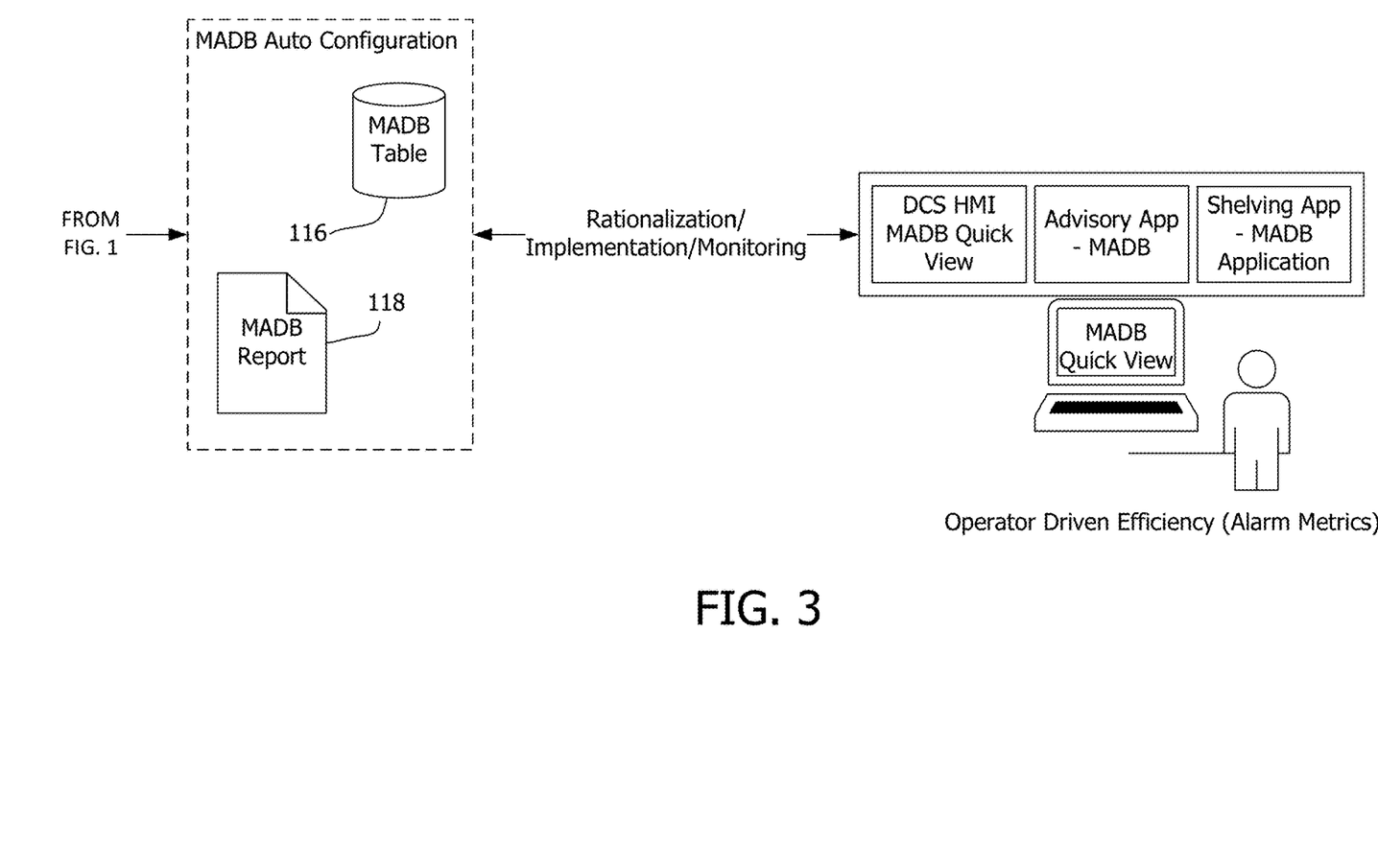
FIG. 3 illustrates a mechanism for providing metrics data to the system of FIG. 1.

Referring now to FIG. 3, aspects of the present disclosure further improve the overall alarm performance of system 100 by feeding back performance metric data and operator-driven efficiency metrics to MADB 116. The MADB 116 is a reference guide for the operator to act on an alarm reported via a workstation for improving efficiency with alarm system performance, device operating metrics and operator driven actions. Note that the operator is not permitted to directly modify MADB 116. In an embodiment, the operator performs actions through interactive software, such as a monitoring and controlling graphical visualization software or system (e.g., Human-Machine Interface (HMI) software), which modifies MADB 116 in accordance with AI alarm engine 110. The interactive software may be standalone or a component or subsystem of the advisory software. Advantageously, AI-based alarm management improves alarm system performance metrics and operator efficiency with alarm metrics and key performance indicators (KPIs) driven by the plant/industry where alarm management philosophy and standards are applied. Aspects of the present disclosure focus on bringing AI into system 100 to train and build a process/domain model, or process/domain intelligence, for automating the alarm rationalization process and the generation of MADB report 118 for operator use. In this manner, aspects of the present disclosure improve the alarm system performance benchmark report enabling the user to continuously compare the system before and after AI controls are employed.

The AI alarm engine 110 evaluates the alarm system performance report and recommends rationalization configurations with an audit as feedback, the feedback being based on risk indicators, as well as recommends needed rationalization settings for the senior process engineers and operators to approve and apply. The solution can recommend and automate rationalization to various projects and support the exportation and importation of MADB report 118 by advisory system 108. The system 100 can further make the MABD guidelines available "on the fly" to the operator or maintenance engineers sitting in front of HMI or advisory software workstations to assess and perform improvised decisions to the context of the process.

Table I, below, is an example of default alarms on equipment for the purpose of defining alarms for equipment and assets 102, including default and custom process alarms:

By implementing the ML/AI systems into the alarm rationalization process to customize the alarm settings, system 100 eliminates or reduces preparation time of the alarm rationalization process by process engineers and operators. This would also result in the elimination of the configuration time of alarm settings defined as part of the alarm rationalization process for each alarm. Since each alarm takes on average of 15-20 minutes to configure per the alarm rationalization guide, this eliminates a significant amount of time on the part of process engineers and operators. The system 100 also allows for an operator or maintenance engineer sitting in front of the HMI or advisory software workstations, respectively, to assess and perform up-to-date improvised decisions for running the assets within safe operating

TABLE I

| Device | Alarm Points | Description | Priority | Latched | Delay |
|---|---|---|---|---|---|
| Transmitter | High | Analog input is above operator-entered high limit | Yellow priority | No | 20 seconds |
| | Low | Analog input is below operator-entered high limit | Yellow priority | No | 20 seconds |
| Motor | Aux Fail | Output to motor is on but PLC is not receiving run indication | Yellow priority | Yes | 2 seconds |
| | Overload | Motor has shut down due to overload condition | Yellow priority | No | N/A |
| | H-O-A | Indicates that the hand-off-auto switch is not in the auto position | Yellow priority | No | N/A |
| Valve | Fail to Open | Valve has been requested to open but valve limit switch does not indicate fully open | Yellow priority | Yes | 20 seconds |
| | Fail to Close | Valve has been requested to close but valve limit switch does not indicate fully closed | Yellow priority | Yes | 20 seconds |
| VFD Motor | Run Fail | PLC output to motor is on but PLC is not receiving run indication | Yellow priority | Yes | 2 seconds |
| | VFD Fault | Frequency drive is faulted | Yellow priority | Yes | N/A |
| | Comm Fault | Communication has been lost | Yellow priority | Yes | N/A |
| Switch | Alarm | Digital indication that level, pressure, flow, etc. has reached an alarm state | Yellow priority | No | 20 seconds |

Table II, below, is an example of custom process alarms. In this example, if the value for Vessel One level (LT1234) is greater than 85% for 5 seconds and the Vessel One Inlet Valve (NV1234) is open, a "red" priority alarm in triggered. The information used to define the custom alarms includes:

Trip Point—The point at which an analog input value from the field will start the delay timer;
Delay—The amount of time needed to expire before displaying an alarm;
Active Conditions—Any other conditions needed to activate an alarm; and
Priority—Alarming severities include:
   Priority 1—Red: Safety and Environmental Critical;
   Priority 2—Orange: Process Critical;
   Priority 3—Yellow: Process Restrictions; and
   Priority 4—Blue: Communication.

limits in the context of the process that is currently running. In an embodiment, system 100 further provides an operator actions tracking profile report as part of an Alarm System Performance report.

Figure 4:
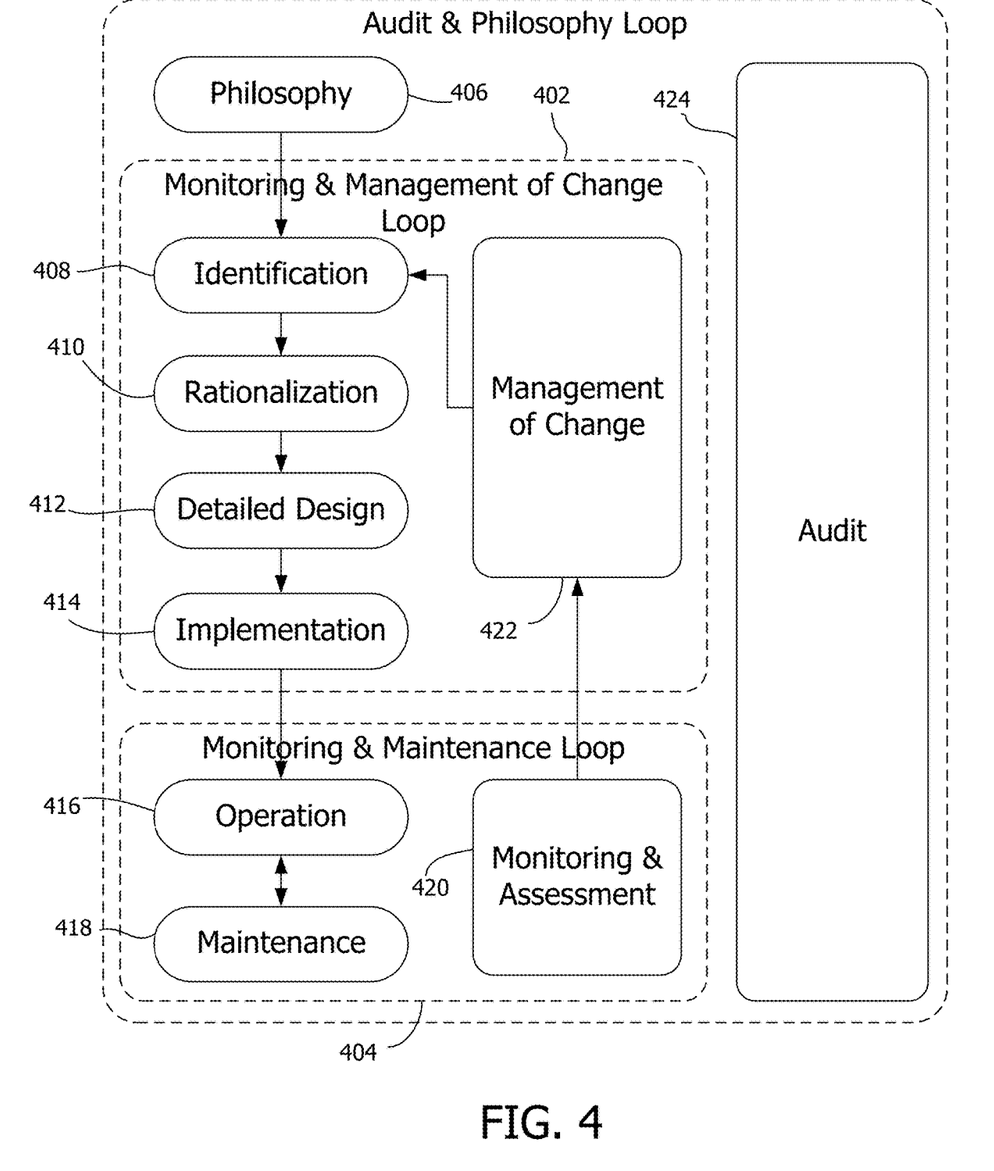
FIG. 4 illustrates an alarm management lifecycle according to an embodiment.

FIG. 4 illustrates an example alarm management lifecycle embodying aspects of the present disclosure. In an embodiment, advisory system 108 software contains all necessary modules to manage alarms of the entire lifecycle, preferably in accordance with the ISA 18.2 Alarm Management Standard. As shown, a monitoring and management of change (MOC) loop 402 defines alarm attributes and documents the rationale for each alarm, resulting in MADB 116. A monitoring and maintenance loop 404 provides a historical alarm/event and OAJ database and permits displaying a KPI dashboard.

TABLE II

| Device | Description | Trip Point | Delay | Active Condition | Priority Level | Latched |
|---|---|---|---|---|---|---|
| LT1234 | Vessel One Level | 85% | 5 seconds | Vessel One Inlet Valve (NV1234) is open | 1-Red | No |
| LIC1000 | Vessel One Level Control, Deviation Alarm | +/−10% | 20 seconds | Vessel One Inlet Valve (NV1234) is open | 1-Red | Yes |

The alarm management lifecycle of FIG. 4 begins at 406 with a predefined alarm philosophy and standard, which documents the objectives, guidelines, and work processes for the alarm system 100 based on objectives and standards for the industrial plant. In an embodiment, AI alarm engine 110 is a plug-in solution in the context of alarm philosophy. The philosophy document preferably includes an alarm philosophy and alarm system requirements specification. At 408, potential alarms are identified based on piping & instrumentation diagrams (P&ID), operating procedures, process and control narratives, default equipment alarms, etc. Rationalization at 410, as described above, is a work process that determines which alarms are necessary, establishes their design settings (e.g., priority, limit, classification), and documents their basis (cause, consequence, corrective action, time to respond, etc.) in MADB 116. According to aspects of the present disclosure, the system 100 employs AI alarm engine 110 to perform AI-based rationalization from the alarm philosophy and list of potential alarms. In an embodiment, AI alarm engine 110 resides at 408 and 410 of the alarm philosophy and automates rationalization 410 during the preparation process (identifying, defining, and creating "mandate" alarms for a given design) as described above in connection with FIG. 1.

Detailed design at 412 involves designing the system 100 to meet the requirements defined in the rationalization at 410 in accordance with the philosophy at 406. The detailed design includes basic alarm design, HMI design, and advanced alarming design based on the alarm design requirements documented in MADB 116. Implementation of the alarm system 100 at 414 includes, for example, installation and commissioning, initial testing, and initial training. And implementation results in operational alarms, alarm response procedures, and automating the alarm rationalization settings for each alarm, which results in generating the MADB guide 118. Advantageously, aspects of the present disclosure overcome the need for configuring rationalization settings manually (e.g., approximately 15-20 minutes for each alarm). In an embodiment, AI alarm engine 110 also resides at 414 of the monitoring and MOC loop 402 and automates aspects of the implementation 414.

The monitoring and maintenance loop 404 includes operation at 416 during which the alarm system 100 is functional. Operators use available tools (e.g., shelving and alarm response procedures, MADB report 118) to diagnose and respond to alarms. Alarms may need to be taken out of service for repair and replacement, periodic testing, etc. for maintenance at 418 depending on alarm monitoring reports and alarm philosophy. As described above, alarm data produced during operation and maintenance is fed back to AI alarm engine 110 to improve system 100. Monitoring and assessment at 420 measures alarm system performance for comparison against KPIs from the philosophy. Problem alarms are identified (nuisance alarms, frequently occurring alarms) and provided to AI alarm engine 110. In an embodiment, AI alarm engine 110 also resides at 420 of the maintenance and monitoring loop 404 and provides "updated" feedback to automate the rationalization 410 (and update MADB 116) of the running system for the operator to act with the provided "on the fly" rationalization settings. Management of change at 422 is a process to authorize additions, modifications, and deletions of alarms. The alarm management lifecycle concludes with an audit at 424 for periodic auditing the alarm management processes (e.g., comparing DCS alarm settings to the MADB 116), standards, alarm philosophy, audit protocol, and the like. As described above, aspects of the present invention enable applying recommendations. For instance, MOC at 422 reviews and approves recommendations for the audit at 424.

Referring further to FIG. 4, in an embodiment, AI-based alarm rationalization of a new Greenfield (preferably unrationalized) system uses existing process/domain knowledge available with system 100 in the form of a configuration of process and control narratives (loops or logics) (see FIG. 1) that has already been designed and documented. For an existing Brownfield system (rationalized or unrationalized), for example, aspects of the present disclosure additionally explore the historical alarms, OAJ messages, process data, process and control narratives, etc. Advantageously, AI-based alarm rationalization analyzes data using AI/ML and applies appropriate alarm settings automatically with an audit generated by the MOC module. In this regard, AI alarm rationalization engine 110 in combination with MOC for review and approval of changes and shelving utilities to inhibit and uninhibit alarms to improve alarm performance efficiency encompasses the alarm philosophy.

Aspects of the present disclosure improve the efficiency of alarm management systems by focusing on: the alarm rationalization preparation process; "on the fly" updated alarm rationalization settings for the operator of a running/live system; automation of MADB 116; alarm system performance metrics; device/equipment/asset operational metrics; operator operational metrics; continuously evolving to address other factors in the alarm management (involving rationalization) process and philosophy.

According to the aspects of the present disclosure, the following describes AI-based alarm management example use cases and solutions. In general, the use cases recognize a need for alarm system performance driven through rationalization automation for both unrationalized and rationalized systems and the solutions provide alarm rationalization definition models (with domain/expertise). The definition models include: data sheets for assets 102 defining equipment alarms); existing expertise/knowledge on control and process narratives (defining alarms); existing expertise from alarm rationalization data; process operations manual; P&ID; DCS alarm information; and historized processed data, alarms, and OAJ. The outcomes of the AI-based alarm management example use cases use advisory system 108 software to save time during the alarm rationalization preparation process, auto-populate MADB 116 with the rationalization configuration/definition, provide integrity/discrepancy checks and indicators, and import and export MADB report 118.

Table III, below, is an example Benchmark Report capturing an alarm performance assessment through rationalization and feeding back recommendations to the source systems (e.g., DCS system). In an embodiment, advisory system 108 software provides: an evaluation, comparison, and recommendations based on alarm performance metrics feedback; an automatic evaluation based rationalization configuration with audit; and recommendations on additional needed rationalization.

TABLE III

| Metric | Target | As Found | Evaluation |
|---|---|---|---|
| Annunciated alarms per hour per operator console (average) | ~6    ~12 | 5.8 | Acceptable |
| Annunciated alarms per 10 minutes per operator console (average) | ~1    ~2 | 0.9 | Acceptable |
| Percentage of 10-minute periods containing more than 10 alarms | ~<1% | 6.20% | Critical |
| Maximum number of alarms in a 10 minute period | ≤10 | 157 | Critical |
| Percentage of time the alarm system is in a flood condition | ~<1% | 22.30% | Critical |
| Percentage contribution of top 10 most frequent alarms to overall alarm load | ~<1% to 5% maximum | 4.70% | Manageable |
| Quantity of chattering and fleeting alarms | Zero | 132 | Critical |
| Stale alarms | Less than 5 present on any day | 2 | Acceptable |
| Annunciated Priority - % of Highest Priority Alarms | ~<1% | 0.75% | Acceptable |
| Annunciated Priority - % of High Priority Alarms | ~5% | 9.19% | Critical |
| Annunciated Priority - % of Medium Priority Alarms | ~15% | 15.00% | Manageable |
| Annunciated Priority - % of Low Priority Alarms | ~80% | 75.06% | Acceptable |

At a high level, a solution embodying aspects of the present disclosure targets alarm rationalization process automation: preparation time; configuration time; and operational (for both rationalized and unrationalized systems). The solution thus improves engineering efficiency, alarm system performance, and device and operator operational efficiency (operator metrics for both rationalized and unrationalized systems).

In an embodiment, the present disclosure focuses on bringing AI into the rationalized or unrationalized system building process & control narratives and flows and historized data-based alarm models employing ML and deep learning to train and build the "Process/Domain" intelligence on continuous basis to automate rationalization process and the generation of the MADB report 118 for operator use to improve the alarm system performance benchmark report. The AI alarm engine 110 evaluates the alarm system performance report and recommends rationalization configurations with an audit as feedback, the feedback being based on risk indicators, as well as recommend needed rationalization settings for the senior process engineers and operators to approve and apply. The solution is configured to recommend and automate rationalization to various projects and support the exportation and importation of MADB report 118. In this manner, aspects of the present disclosure provide rationalization based on the AI engine 110, alarm performance with "Risk" report metrics, and both auto (with audit/management of change) and manual rationalization support based on the AI system recommendations/feedback.

The following use cases illustrate aspects of the present disclosure and how such aspects build recommendations and solutions for an alarm system:

A. Pump on/off using alarms (Prioritized P4 as Events rather than Alarms):

The HIGH/LOW alarms will be used to auto start/stop the pumps.

When the alarm occurs, the operator does not have any action to take so this alarm can be made P4, which will be recorded as an event rather than as an alarm.

B. Alarms in measurement and in controller blocks (Correlated or Duplicate Alarms):

In closed loops, the process alarms can be configured in controller blocks alone and duplicate alarms configured in measurement blocks can be removed.

C. Duplicate alarms from a third party system, such as a machine monitoring system (Duplicate Alarms):

The critical controls of the compressors, pumps and other machines are controlled third party system.

Their healthiness and conditions are monitored by their own control system.

Interface logics and alarms are hooked with DCS for operator information.

The duplicate alarms need to be removed if configured.

D. Alarms for operator-initiated actions (Prioritized P4 as Events):

Alarms configured for reset switches and other hand switches need not be annunciated rather be recorded as priority 4 alarms.

E. Identifying bad actors with alarm statistics (Immediate Attention):

Continuous bad alarms—may be part of decommissioned systems.

Top 20 frequent alarms in each process area (focusing on the most frequent alarms improves system performance).

Top 20 standing alarms in each process area.

F. Alarms in all 2 out of 3 transmitters (Correlated Alarms):

The 2 out of 3 transmitters are hooked up to safety systems, the process value of all the transmitters will be interfaced for operator support.

Alarming all the three transmitters can be removed in favor of having alarm for deviation alone.

G. Correlated alarms—Significance.

H. Events vs Alarms.

I. Shelving and Unshelving Alarms (Dynamically or Manually).

J. Identify and reducing chattering and flooding alarms.

K. Uniformity of alarm setpoints and priorities.

L. Operators actions tracking report:
  Time to response.
  Alarms for operator-initiated actions.
  Measurement of operator acceptance times.
M. Device/Equipment/Asset operating indicator and report:
  Safe vs Deviation.
  Deadband range.
N. Continuous Alarm Assessment Report:
  Before and After controls until the system is reliable and robust.

Figure 5:
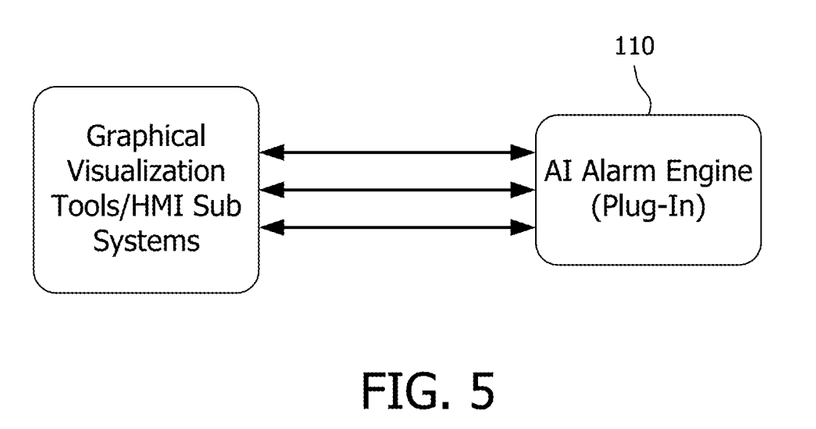
FIG. 5 illustrates further aspects of the AI alarm engine of FIG. 2.
Figure 6:
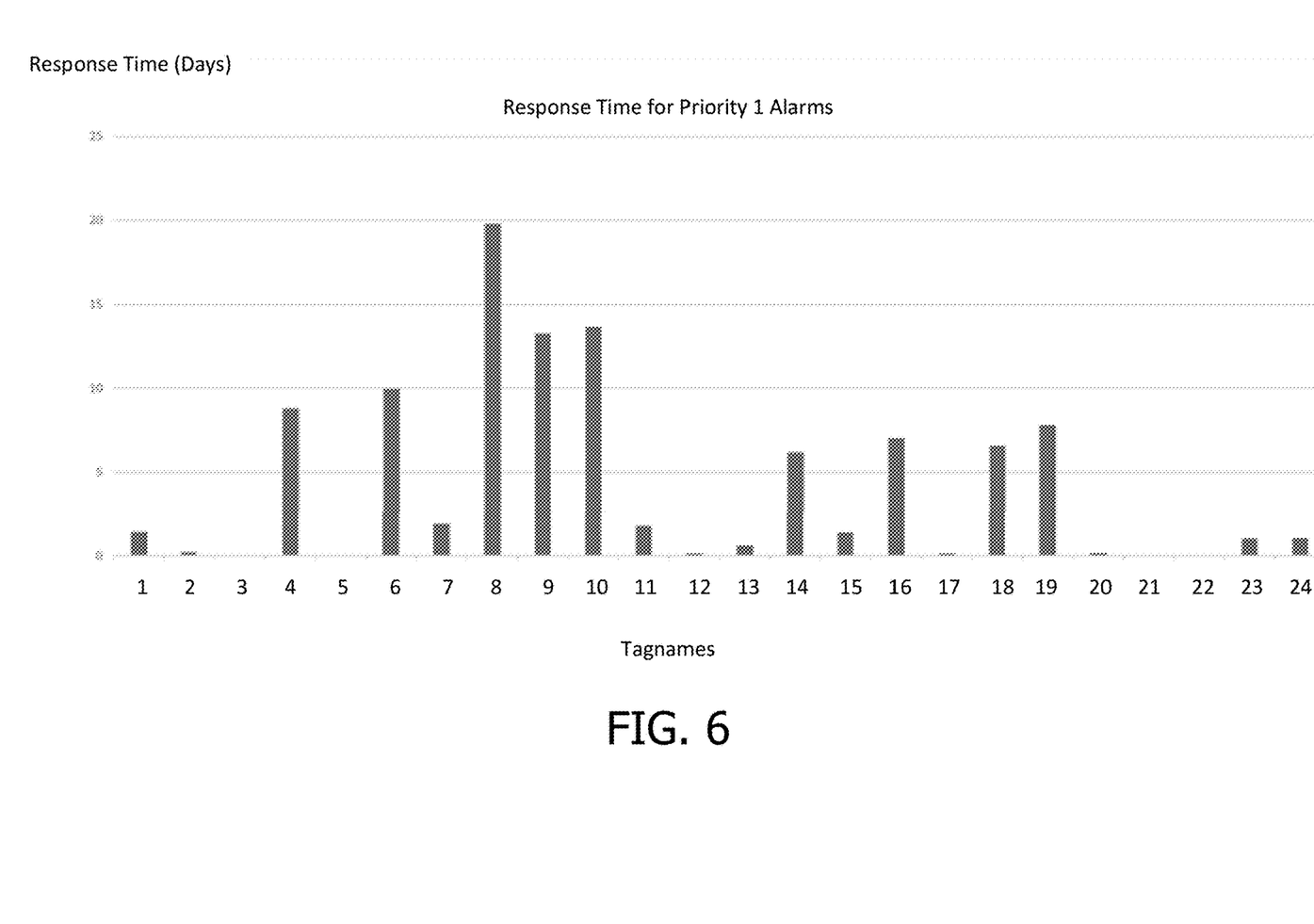
FIG. 6 is a graph illustrating alarm priority based on response time according to an example use case.
Figure 7A:
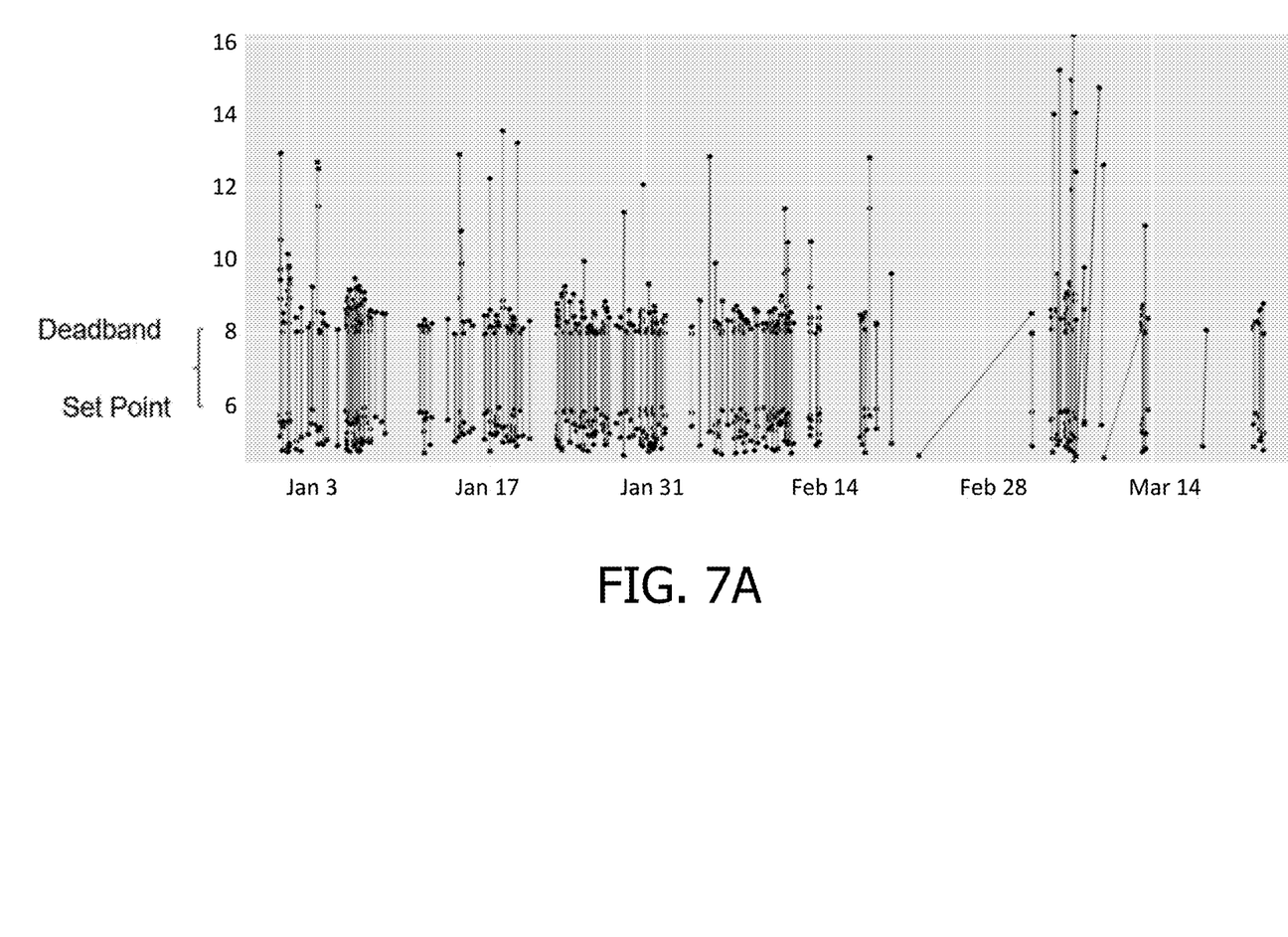
FIG. 7A is a graph illustrating chattering alarms according to another example use case.
Figure 7B:
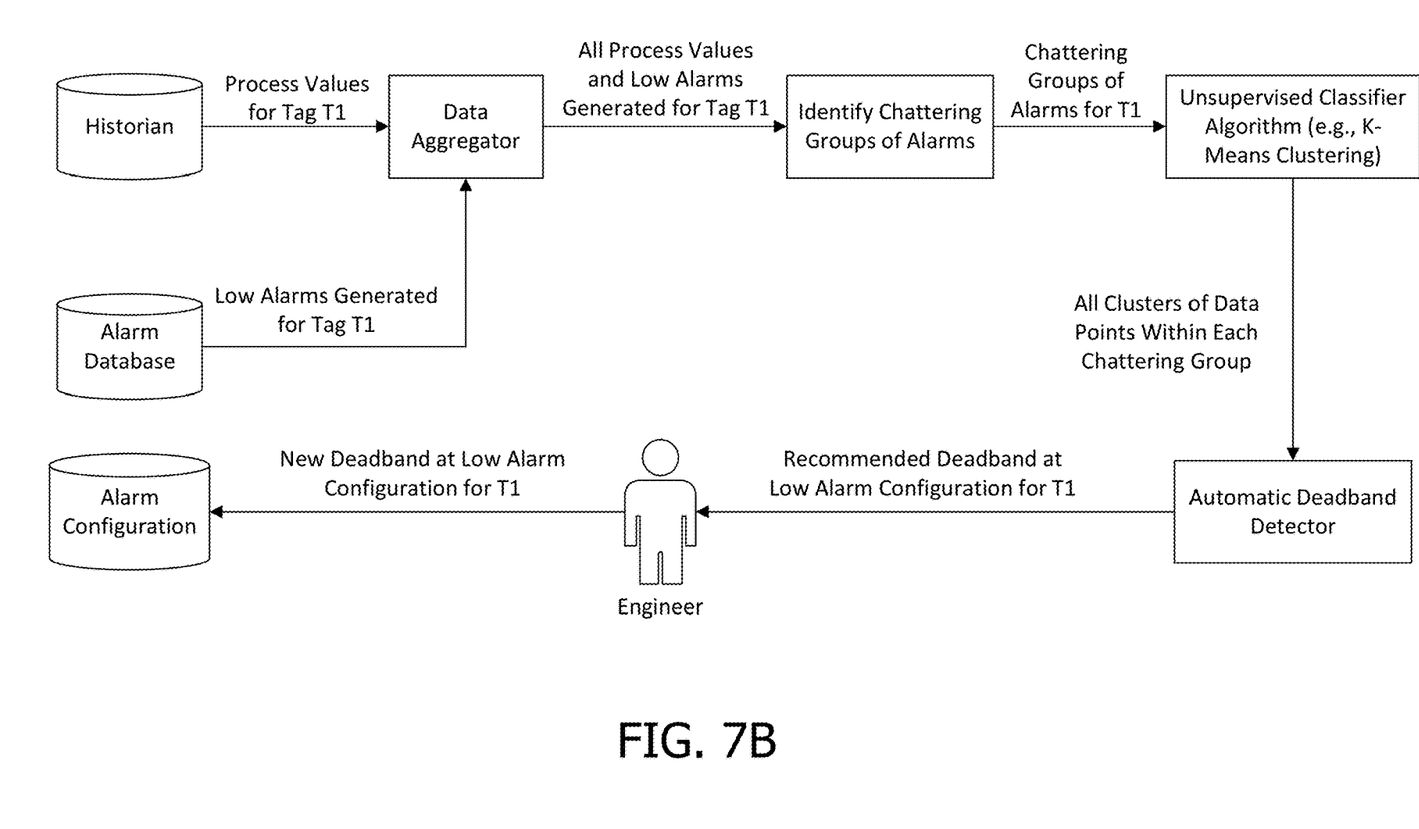
FIG. 7B illustrates example workflow for the chattering alarms use case of FIG. 7A.
Figure 7C:
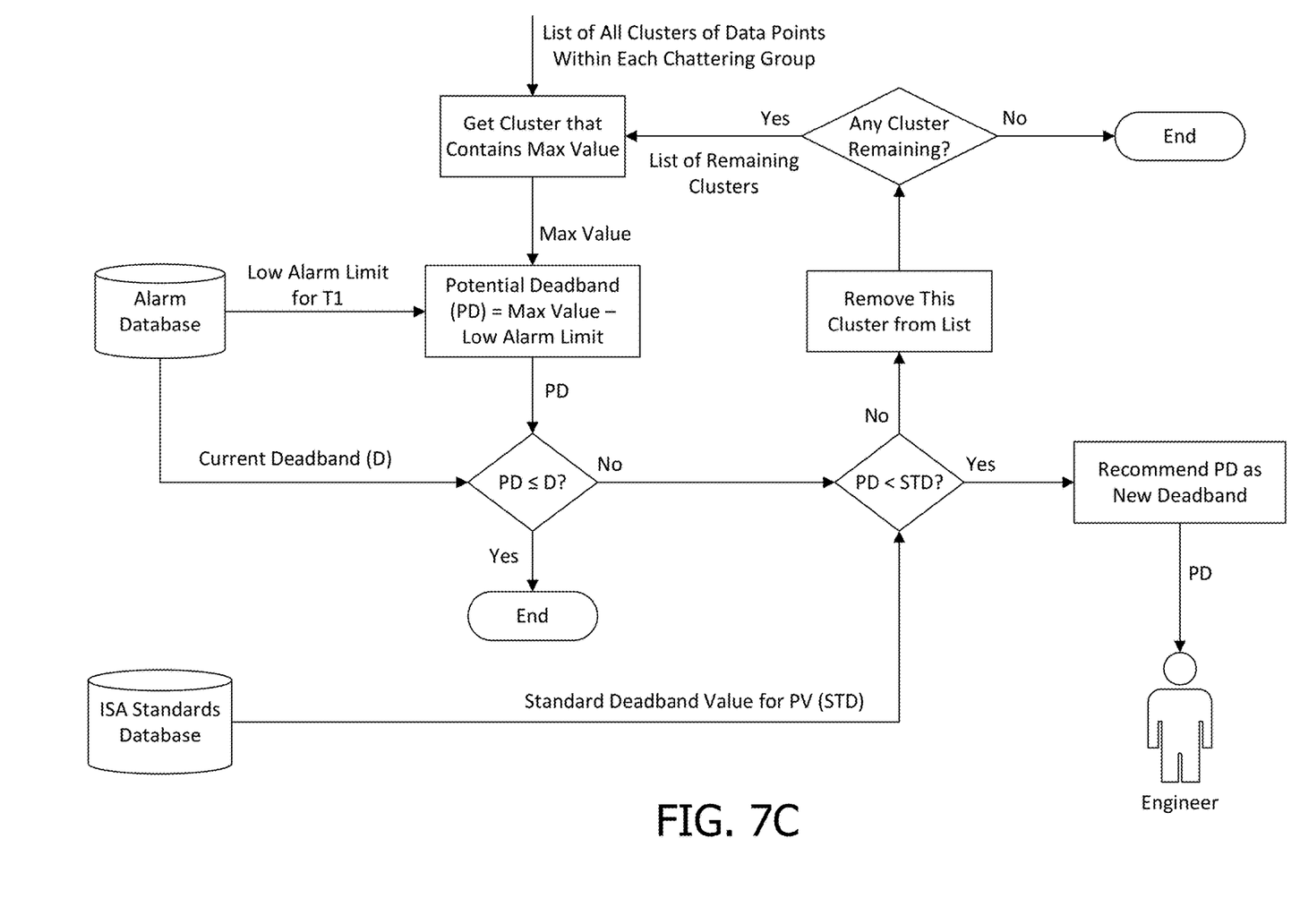
FIG. 7C illustrates an example workflow for an automatic deadband detector of the workflow of FIG. 7B.
Figure 8A:
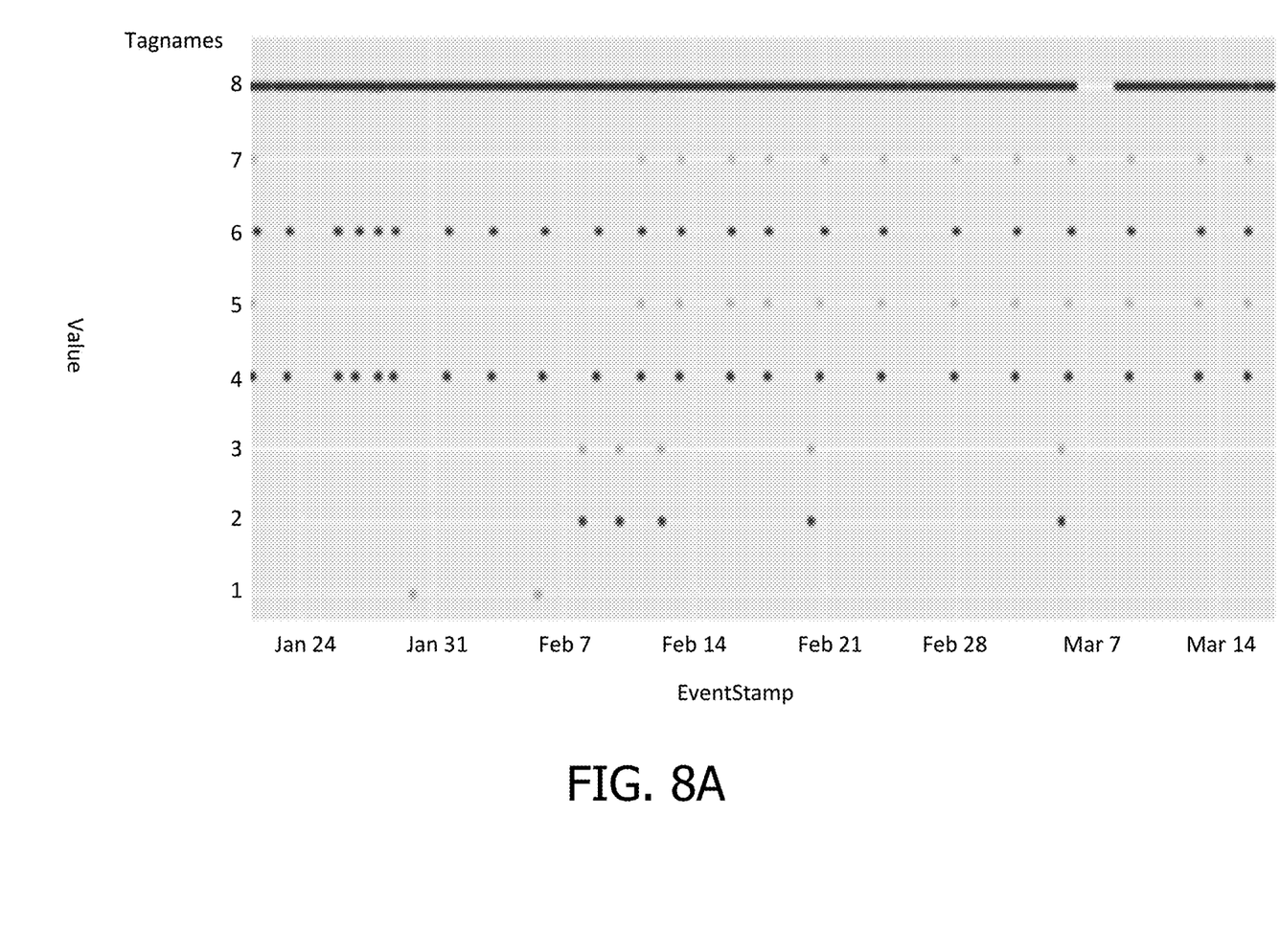
FIGS. 8A and 8B are graphs illustrating identification of alarm root cause according to yet another example use case.
Figure 8B:
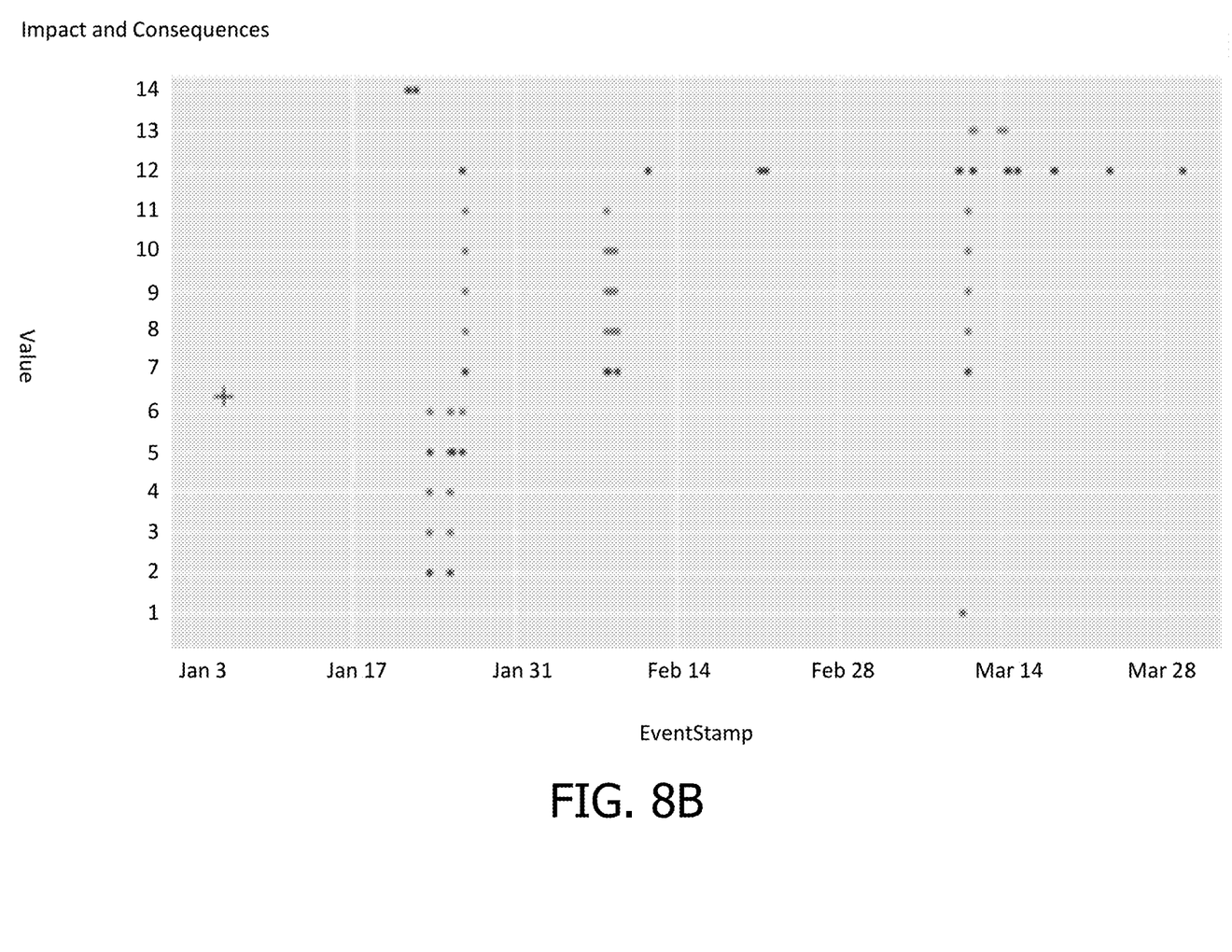

FIG. 5 illustrates further aspects of AI alarm engine 110. In an embodiment, AI alarm engine 110 works in real time and is structured to be standalone or integrated into a process control system such that it receives inputs from various subsystems of the process control system.

In operation, both AI/ML and statistical/mathematical models build and train AI alarm engine 110 through traditional and deep learning ML methodologies for the context of the problem/input. Aspects include modeling alarm rationalization process preparation through process and controls and provides a rationalization guide for both unrationalized or rationalized systems. Further aspects include evolving or training the AI alarm engine 110 on a continuous basis in a more "generalized" way (can learn and respond to "new" data with accuracy and precision as the outcome) and identifying and predicting performance improvement patterns from historized data.

This disclosure should not be construed to be confined to one process industry but can be extended and train the system wherever an alarm rationalization process is performed. This disclosure further enables a system to train digitally to build "Process/Domain" intelligence that is currently available only with senior experts.

APPENDIX A provides examples of three use cases based on historized data (applying ML) embodying aspects of the present disclosure.

Embodiments of the present disclosure may comprise a special purpose computer including a variety of computer hardware, as described in greater detail herein.

For purposes of illustration, programs and other executable program components may be shown as discrete blocks. It is recognized, however, that such programs and components reside at various times in different storage components of a computing device, and are executed by a data processor(s) of the device.

Although described in connection with an example computing system environment, embodiments of the aspects of the invention are operational with other special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the example operating environment. Examples of computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the present disclosure may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the present disclosure may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments may be implemented with processor-executable instructions. The processor-executable instructions may be organized into one or more processor-executable components or modules on a tangible processor readable storage medium. Also, embodiments may be implemented with any number and organization of such components or modules. For example, aspects of the present disclosure are not limited to the specific processor-executable instructions or the specific components or modules illustrated in the figures and described herein. Other embodiments may include different processor-executable instructions or components having more or less functionality than illustrated and described herein.

The order of execution or performance of the operations in accordance with aspects of the present disclosure illustrated and described herein is not essential, unless otherwise specified. That is, the operations may be performed in any order, unless otherwise specified, and embodiments may include additional or fewer operations than those disclosed herein. For example, it is contemplated that executing or performing a particular operation before, contemporaneously with, or after another operation is within the scope of the invention.

When introducing elements of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively, or in addition, a component may be implemented by several components.

The above description illustrates embodiments by way of example and not by way of limitation. This description enables one skilled in the art to make and use aspects of the invention, and describes several embodiments, adaptations, variations, alternatives and uses of the aspects of the invention, including what is presently believed to be the best mode of carrying out the aspects of the invention. Additionally, it is to be understood that the aspects of the invention are not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

It will be apparent that modifications and variations are possible without departing from the scope of the invention defined in the appended claims. As various changes could be made in the above constructions and methods without departing from the scope of the invention, it is intended that all matter contained in the above description and shown in the accompanying drawings shall be interpreted as illustrative and not in a limiting sense.

In view of the above, it will be seen that several advantages of the aspects of the invention are achieved and other advantageous results attained.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

The invention claimed is:

1. An alarm rationalization system comprising:
   an advisory system processor receiving and responsive to industrial process information collected in real-time from a process control system;
   an advisory system database coupled to the advisory system processor, the advisory system database storing historized alarm information collected from the process control system;
   a Master Alarm Database (MADB) coupled to the advisory system processor; and
   a memory storing computer-executable instructions that, when executed by the advisory system processor, configure the advisory system processor for:
      receiving the industrial process information;
      identifying one or more alarms based on the received industrial process information;
      executing an artificial intelligence (AI) alarm engine, wherein executing the AI alarm engine comprises:
         building a process/domain model based on the received industrial process information and the historized alarm information to evaluate the alarms in accordance with a predefined alarm philosophy;
         generating, by the process/domain model, a plurality of alarm definitions to optimize the alarms; and
         automatically populating the MADB with the alarm definitions, wherein the alarm definitions include at least one of alarm type, priority, class, limit, operator action, or consequence of inaction;
      continuously rationalizing the alarms based on the alarm definitions stored in the MADB, wherein continuously rationalizing comprises evaluating alarm system performance and recommending rationalization configurations with risk indicator-based audit feedback;
      providing an MADB report to determine a plurality of approved alarm definitions;
      configuring the alarms based on the approved alarm definitions;
      identifying one or more problem alarms based on a frequency of alarming;
      updating the process/domain model based on the problem alarms; and
      rationalizing the problem alarms.

2. The system as set forth in claim 1, wherein the computer-executable instructions stored in the memory, when executed by the advisory system processor, further configure the advisory system processor for collecting alarm performance metrics, wherein executing the AI alarm engine further comprises training the process/domain model based on the collected performance metrics, and wherein continuously rationalizing the alarms further comprises feeding back the performance metrics to the MADB.

3. The system as set forth in claim 1, wherein the computer-executable instructions stored in the memory, when executed by the advisory system processor, further configure the advisory system processor for reviewing the alarms against a predefined alarm philosophy, and wherein generating the alarm definitions comprises defining and creating a minimum set of alarms required to maintain normal operating limits of the process control system in accordance with the alarm philosophy.

4. The system as set forth in claim 1, wherein identifying the alarms comprises defining one or more of default alarms, default alarm settings, a default rationalization guide, custom process alarms, and custom equipment alarms.

5. The system as set forth in claim 4, wherein the computer-executable instructions stored in the memory, when executed by the advisory system processor, further configure the advisory system processor for redefining the default alarm settings based on the alarm definitions generated by the process/domain model.

6. The system as set forth in claim 1, wherein the industrial process information comprises one or more of asset information, equipment information, a control narrative, a process narrative, a piping & instrumentation diagram, and an operating procedure.

7. The system as set forth in claim 6, wherein identifying the alarms comprises executing, by a controller associated with the advisory system processor, at least one of the control narrative and the process narrative to trigger at least one of the alarms based on a predefined abnormal condition.

8. The system as set forth in claim 7, wherein the predefined abnormal condition comprises at least one of an equipment malfunction and a process deviation.

9. The system as set forth in claim 1, wherein the process control system is unrationalized prior to rationalizing by the advisory system processor.

10. The system as set forth in claim 1, wherein the AI alarm engine comprises a plug-in component to interactive control system software that, when executed by the advisory system processor, configure the advisory system processor for automating alarm rationalization in adherence to the predefined alarm philosophy.

11. A method of alarm rationalization in a process control system, the method comprising:
   receiving, by an advisory system processor of the process control system, industrial process information collected in real-time from the process control system;
   storing historized alarm information collected from the process control system in an advisory system database coupled to the advisory system processor;
   identifying, by the advisory system processor, one or more alarms based on the received industrial process information;
   executing, by the advisory system processor, an artificial intelligence (AI) alarm engine, wherein executing the AI alarm engine comprises:

building a process/domain model based on the received industrial process information and the historized alarm information to evaluate the alarms in accordance with a predefined alarm philosophy;

generating, by the process/domain model, a plurality of alarm definitions to optimize the alarms; and automatically populating a Master Alarm Database (MADB) with the alarm definitions, wherein the alarm definitions include at least one of alarm type, priority, class, limit, operator action, or consequence of inaction;

continuously rationalizing, by the advisory system processor, the alarms based on the alarm definitions stored in the MADB, wherein continuously rationalizing comprises evaluating alarm system performance and recommending rationalization configurations with risk indicator-based audit feedback;

providing an MADB report to determine a plurality of approved alarm definitions;

configuring the alarms based on the approved alarm definitions;

identifying one or more problem alarms based on a frequency of alarming;

updating the process/domain model based on the problem alarms; and rationalizing the problem alarms.

12. The method as set forth in claim 11, further comprising collecting, by the advisory system processor, alarm performance metrics, wherein executing the AI alarm engine further comprises training the process/domain model based on the collected performance metrics, and wherein continuously rationalizing the alarms further comprises feeding back the performance metrics to the MADB.

13. The method as set forth in claim 11, further comprising reviewing, by the advisory system processor, the alarms against a predefined alarm philosophy, and wherein generating the alarm definitions comprises defining and creating a minimum set of alarms required to maintain normal operating limits of the process control system in accordance with the alarm philosophy.

14. The method as set forth in claim 11, wherein identifying the alarms comprises defining one or more of default alarms, default alarm settings, a default rationalization guide, custom process alarms, and custom equipment alarms.

15. The method as set forth in claim 14, further comprising redefining, by the advisory system processor, the default alarm settings based on the alarm definitions generated by the process/domain model.

16. The method as set forth in claim 11, wherein the industrial process information comprises one or more of asset information, equipment information, a control narrative, a process narrative, a piping & instrumentation diagram, and an operating procedure.

17. The method as set forth in claim 16, wherein identifying the alarms comprises executing, by a controller associated with the advisory system processor, at least one of the control narrative and the process narrative to trigger at least one of the alarms based on a predefined abnormal condition.

18. The method as set forth in claim 17, wherein the predefined abnormal condition comprises at least one of an equipment malfunction and a process deviation.

19. The method as set forth in claim 11, wherein the process control system is unrationalized prior to rationalizing by the advisory system processor.

20. The method as set forth in claim 11, wherein the rationalizing comprises executing the AI alarm engine to automate a preparation process, the preparation process including identifying, defining, and creating one or more alarms.

21. A method of alarm rationalization in an alarm system of a process control system, the method comprising:

defining a default alarm setting for at least one of an equipment alarm and a custom process alarm;

defining a rationalization guide independent of a rationalization status of the alarm system;

executing logic on a controller of the process control system to trigger an alarm in response to a predetermined condition;

defining and creating a minimum set of alarms required to maintain normal operating limits of the process control system based on a predetermined standards-based alarm philosophy;

historizing data collected in real-time from the process control system;

identifying and predicting performance improvement patterns based on the historized data;

training an artificial intelligence (AI) alarm engine based on the historized data and the rationalization guide to perform one or more of the previous steps;

generating one or more alarm rationalization settings based on an audit of the performance improvement patterns, wherein the audit includes risk indicator-based feedback;

automatically populating an alarm rationalization Master Alarm Database (MADB) report to feed the alarm rationalization settings to the alarm system, wherein the alarm rationalization settings include at least one of alarm type, priority, class, limit, operator action, or consequence of inaction;

providing the MADB report to determine one or more approved alarm rationalization settings;

configuring the alarm system based on the approved alarm rationalization settings, wherein the alarm rationalization settings are automatically configured into visualization software; and repeatedly retraining the AI alarm engine, wherein repeatedly retraining the AI alarm engine comprises feeding back performance metric data and operator-driven efficiency metrics to the MADB.

22. The method as set forth in claim 21, wherein the logic executed to trigger the alarm comprises at least one of a control flow, a control narrative, a process flow, and a process narrative.

23. The method of claim 21, further comprising dynamically applying the alarm rationalization settings to suppress nuisance alarms during live operation based on real-time performance metrics.

24. The method of claim 21, wherein retraining the AI alarm engine comprises applying reinforcement learning based on operator feedback and alarm resolution outcomes.

25. The system of claim 1, wherein updating the process/domain model based on the problem alarms improves at least one of: alarm response time, reduction in alarm flooding, or operator decision-making efficiency.

26. The system of claim 1, wherein the advisory system processor is embedded within a distributed control system (DCS) node and configured to apply rationalization settings in real-time during live process operation.

* * * * *